Patented July 2, 1935

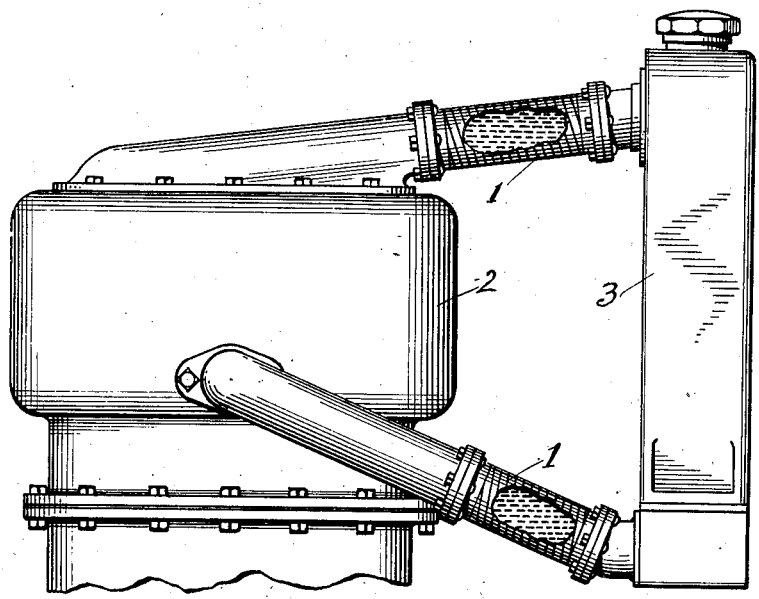

2,007,007

UNITED STATES PATENT OFFICE 2,007,007

HEAT TRANSFER LIQUID

Foster Dee Snell, Brooklyn, N. Y.

Application June 4, 1932, Serial No. 615,339

13 Claims. (Cl. 252—5)

The present invention relates to heat transfer systems and aims to provide an improved system having an effective heat transfer liquid.

The invention has been developed more particularly in connection with the production of heat transfer liquids for use in cooling systems of internal combustion engines including both engines in which the cooling liquid is subjected only to high temperature and those which are to be operated under conditions such that the cooling liquid is subjected to a wide range of temperatures, such for example, as the engines of airplanes and automobiles. For convenience of disclosure the invention will be more particularly described in this relation, but it will be understood that the particular description is illustrative and not intended as defining the limits of application of the invention.

In order to satisfy the requirements of use a heat transfer liquid to be used at high temperatures must be stable to resist decomposition and it should not evaporate unduly at operating temperatures. If it is subjected to low temperatures as when used in automobile and airplane engines, it must not freeze or so solidify as to prevent or seriously retard circulation when the engine is started after long exposure. Water as a cooling medium though commonly used does not well satisfy these needs. Certainly it does not permit operation of the engine at the thermodynamically optimum working temperature. The anti-freeze liquids commonly used are troublesome in that they cause sluggish circulation and over-heating together with leakage at connections, and frequently they do not give satisfactory protection against freezing. Furthermore, they are subject to the same objection as water in that they do not permit operation of the engine at the optimum working temperature.

Thermodynamic considerations indicate that if the engine is operated at substantially higher temperatures than is usual practice, better mechanical efficiency is obtained.

The present invention has for an object to provide a heat exchange liquid which will not corrode metals and will not become decomposed, polymerized or gummy after continued use.

Another object is to provide a liquid which will have a relatively low specific heat.

A further object is to provide, particularly for use in cooling systems such as those of automobile and aircraft engines in which the liquid is subject to a wide range of temperature, a non-freezing liquid which will flow freely at low temperatures and which will also have a high boiling point and permit operation of the engine at high temperatures.

Another object is to provide a liquid which will show little change in viscosity over a wide temperature range.

A further object is to provide improved connections between the radiator and the engine proper which will be sufficiently flexible to permit the unequal expansion and slight relative movement of the engine and radiator and connections which will not be impaired by exposure to the cooling liquid.

A still further object is to provide a complete cooling system including a stable heat transfer liquid with a cooling radiator, an engine jacket and flexible connections within which the liquid can circulate without causing deterioration of the parts.

With the foregoing objects in view the invention provides a cooling liquid which operates effectively at high temperatures and as a particular species a liquid which is particularly suitable for use in automobiles and airplane engines under the conditions of use and improved flexible connections for the engine and radiator which will withstand the deteriorating effects of the cooling fluid. The liquid is also effective for use in maintaining a constant temperature as for example in catalytic baths and the like.

In the accompanying drawing the figure is a diagrammatic view conventionally illustrating a circulating system.

In accordance with the invention the preferred cooling liquid comprises partially or fully chlorinated benzene in which the chlorine is substituted for one or more hydrogen atoms of the benzene ring, or partially or wholly chlorinated naphthalene or diphenyl or a suitable mixture of these compounds. Of the chlorinated naphthalenes the alpha chloronaphthalene is probably the most practicable. It has a satisfactory range between the melting point and boiling point and at present can be obtained commercially at a satisfactory price.

All of these liquids are stable at high temperatures. If only high temperatures are to be considered the compounds or mixtures having a high boiling point may be selected, but if the system is to be subject to low temperatures the freezing point must also be considered. For a high temperature system, for example, hexachlorobenzene, melting at 225° C., combined with a sufficient proportion of one of the lower chlorinated products or diphenyl to lower the melting point to the extent desired provides an excellent heat exchange liquid. Depending upon the requirements, principally the desired temperature range, the proportions of the ingredients may vary widely, even a proportion of the order of 5% of one compound may sufficiently lower the freezing point of the mixture to the desired range. Graphs may be drawn showing the melting points or boiling points of various proportions of the different ingredients, thus facilitating the selection of particular compounds for uses under particularly prescribed conditions.

For a cooling system subject to a wide range of temperatures an effective composition may consist of trichlorobenzene to which is added alpha-chloronaphthalene or polychlorobenzene in proportions to satisfy the conditions of use. Ordinarily for winter use in temperate climates a composition containing substantially one part by weight of trichlorobenzene and one part of alpha-chloronaphthalene and/or polychlorobenzene is satisfactory.

A composition containing equal parts by weight of polychlorobenzene (principally dichloro- with some trichloro-benzene) and alphachloronaphthalene has a freezing point of −50° F. while one containing equal parts of trichlorobenzene and alphachloronaphthalene has a freezing point of −33° F. A composition containing equal parts by weight of trichlorobenzene and polychlorobenzene has a freezing point of 3° F. Such composition of trichlorobenzene and alphachloronaphthalene has been selected as a preferred composition, satisfying several practical requirements. It shows a viscosity variation of from about 85 seconds at −13° F. (Saybolt) to about 29 seconds at 210° F. As a matter of fact the viscosity varies relatively little between temperatures of 20 and 210° F., and although it falls off quite rapidly at temperatures below 20° F. effective operation under operative conditions in an internal combustion engine is obtained.

The relatively slow flow of the cooling medium at low temperatures is an advantage in that it permits the engine to heat to operative temperature more quickly.

The rate of evaporation of the composition at engine temperature is very low. Tests made at a temperature of 105° F. show an evaporation from an open dish of about 55% after 26 hours as compared with an evaporation of over 56% of water after only 2 hours.

Corrosion tests on the metals commonly used in engine cooling systems indicate either no corrosion or such as is entirely negligible. In the tests made a small percentage of water was introduced into the composition for the reason that the presence of water in the hydrocarbon would tend to increase the corrosion.

The composition is stable and does not produce a gummy residue upon continued use at high temperatures. It is non-inflammable and non-explosive.

The specific heat is substantially less than that of water and will facilitate operation at higher temperatures.

The invention contemplates also the provision of improved flexible connections between the engine and radiator which connection will withstand the action of the cooling liquid described. As a preferred connection a flexible metal tubing 1 is employed between the engine 2 and the radiator 3, the tubing 1 being of such construction that only metal is contacted by the cooling liquid. A cooling system in which the described cooling liquid circulates through the engine jacket, radiator and flexible metal connections meets with the many requirements of automobile and aircraft operation.

When the liquid above described is used to maintain a controlled temperature, as for chemical reactions, by virtue of a constant boiling point or freezing point, a suitable mixture is compounded to meet the particular requirements. For example, hexa-chloro-benzene having a melting point of 225° C. is combined with just enough of one of the lower chlorination products to lower the melting point (or the boiling point) to the desired temperature. The composition may then be used in a suitable apparatus such as those of known types in which mercury or other liquid is used.

The foregoing particular description is illustrative merely and is not intended as defining the limits of the invention.

I claim:

1. A heat transfer liquid comprising a considerable proportion of trichlorobenzene and a substantial proportion of another relative non-volatile liquid of the group consisting of dichlorobenzene, chlorinated naphthalene and diphenyl.

2. A heat transfer liquid comprising a considerable proportion of alphachloronaphthalene and a substantial proportion of another relatively non-volatile liquid of the group consisting of chlorinated benzene and diphenyl.

3. A heat transfer liquid for use in the cooling system of an internal combustion engine consisting of a mixture of substantial proportions of at least two of the liquids, of the group consisting of the chlorinated benzenes, chlorinated naphthalenes and diphenyl.

4. A heat transfer liquid for use in the cooling system of an internal combustion engine consisting of a mixture of substantial proportions of at least two liquids of the group consisting of the chlorinated benzenes, the chlorinated naphthalenes and diphenyl combined in a proportion to reduce the melting point to a temperature below the temperatures to which the liquid is to be subjected in use.

5. A heat transfer liquid for use in the cooling system of an internal combustion engine consisting principally of a mixture of trichlorobenzene and a compound of the group consisting of alpha-chloronaphthalene and dichlorobenzene in a proportion sufficient to reduce the freezing point of the composition to a point below the temperature to which the composition is to be subjected in use.

6. A heat transfer liquid for use in the cooling system of an internal combustion engine consisting principally of trichlorobenzene and alpha-chloronaphthalene in substantially equal proportions.

7. A heat transfer liquid for use in the cooling system of an internal combustion engine consisting principally of polychlorobenzene and alpha-chloronaphthalene in substantially equal proportions.

8. A liquid composition for use in a constant temperature bath comprising a mixture of liquids of the group consisting of the chlorinated benzenes, the chlorinated naphthalenes and diphenyl, compounded in proportions to provide a melting point at the predetermined temperature to be maintained.

9. A liquid composition for use in a constant temperature bath comprising a mixture of liquids of the group consisting of the chlorinated benzenes, the chlorinated naphthalenes and diphenyl, compounded in proportions to provide a boiling point at the predetermined temperature to be maintained.

10. A heat transfer liquid for use in the cooling system of an internal combustion engine comprising a mixture of tri-chloro-benzene and alpha-chloro-naphthalene in a proportion sufficient to reduce the freezing point of the mixture to a point below the temperature to which the composition is to be subjected in use.

11. The method of cooling an internal combustion engine which consists in circulating a cooling medium thereabout, comprising as a principal ingredient trichlorobenzene with 5% or more of liquid of the group consisting of dichlorobenzene, alphachloronaphthalene and diphenyl.

12. The method of cooling an internal combustion engine which consists in circulating a cooling medium thereabout, consisting principally of chlorinated benzene and chlorinated naphthalene in proportions of the order of 1 to 1.

13. A composition of matter having a melting point below 0° C. and a boiling point above 100° C., and having relatively slight viscosity change between these temperatures, consisting of a mixture of tri-chloro-benzene and another liquid of the group consisting of di-chloro-benzene, chlorinated naphthalene and diphenyl.

FOSTER DEE SNELL.